US008895163B2

(12) United States Patent
Onoue

(10) Patent No.: US 8,895,163 B2
(45) Date of Patent: Nov. 25, 2014

(54) PERPENDICULAR MAGNETIC RECORDING MEDIUM

(75) Inventor: Takahiro Onoue, Singapore (SG)

(73) Assignee: WD Media (Singapore) Pte. Ltd., Singapore (SG)

(*) Notice: Subject to any disclaimer, the term of this patent is extended or adjusted under 35 U.S.C. 154(b) by 232 days.

(21) Appl. No.: 12/751,329

(22) Filed: Mar. 31, 2010

(65) Prior Publication Data
US 2010/0247965 A1 Sep. 30, 2010

(30) Foreign Application Priority Data

Mar. 31, 2009 (JP) ................... 2009-087759
Mar. 30, 2010 (JP) ................... 2010-077948

(51) Int. Cl.
G11B 5/66 (2006.01)
G11B 5/73 (2006.01)
G11B 5/667 (2006.01)
G11B 5/82 (2006.01)

(52) U.S. Cl.
CPC . G11B 5/667 (2013.01); G11B 5/82 (2013.01); G11B 5/7325 (2013.01); G11B 5/66 (2013.01)
USPC .......................................... 428/828; 428/831

(58) Field of Classification Search
None
See application file for complete search history.

(56) References Cited

U.S. PATENT DOCUMENTS

| 2005/0008902 | A1 | 1/2005 | Bertero |
| 2006/0126371 | A1 | 6/2006 | Nagase |
| 2007/0153419 | A1* | 7/2007 | Arai et al. ............. 360/131 |
| 2007/0187227 | A1 | 8/2007 | Marinero |
| 2008/0062575 | A1 | 3/2008 | Shimizu |
| 2009/0052074 | A1* | 2/2009 | Nakagawa et al. .......... 360/39 |
| 2010/0247964 | A1* | 9/2010 | Onoue et al. ................ 428/800 |

FOREIGN PATENT DOCUMENTS

| JP | 2006-024346 A | 1/2006 |
| JP | 2006-048860 | 2/2006 |
| JP | 2007-184019 | 7/2007 |
| JP | 2008-016103 | 1/2008 |
| JP | 2009-048720 | 3/2009 |
| JP | 2009-064520 | 3/2009 |

OTHER PUBLICATIONS

Singapore written opinion in case 201002261-4 dated Feb. 2, 2011. 14 Pages.
T. Oikawa, et al., "Microstructure and Magnetic Properties of CoPtCr—SiO2 Perpendicular Recording Media," IEEE Transactions on Magnetics, Sep. 2002, pp. 1976-1978, vol. 38, No. 5.
Singapore Written Opinion for Application No. 201002261-4, dated Oct. 25, 2011, 7 pages.
Japanese Office Action dated Feb. 18, 2014 for related Japanese Application No. 2010-077948, 8 pages.

* cited by examiner

Primary Examiner — Holly Rickman

(57) ABSTRACT

In a perpendicular magnetic recording medium having, over a substrate, a magnetic recording layer, an underlayer made of Ru or a Ru compound and provided below the magnetic recording layer, a pre-underlayer made of a nonmagnetic crystalline material, and a soft magnetic layer provided below the pre-underlayer, when the difference between the highest point and the lowest point of unevenness of the interface between the soft magnetic layer and the pre-underlayer, derived by a cross-sectional TEM image, is given as an interface roughness (nm) and the distance between the soft magnetic layer and the magnetic recording layer, excluding the soft magnetic layer and the magnetic recording layer, is given as a SUL-MAG distance (nm), interface roughness (nm)≤0.4 (nm) and interface roughness×SUL-MAG distance (nm)≤12 (nm) are satisfied.

4 Claims, 4 Drawing Sheets

| SOFT MAGNETIC LAYER/PRE-UNDERLAYER INTERFACE ROUGHNESS [nm] | THICKNESS OF PRE-UNDERLAYER [nm] | THICKNESS OF UNDERLAYER [nm] | THICKNESS OF MAGNETIC RECORDING LAYER [nm] | THICKNESS OF AUXILIARY RECORDING LAYER [nm] | TOTAL THICKNESS [nm] | ROUGHNESS OF MEDIUM [nm] | SNR [dB] |
|---|---|---|---|---|---|---|---|
| 1.2 | 10 | 30 | 15 | 10 | 65 | 1.8 | 17.2 |
| 0.7 | 7 | 25 | 12 | 7 | 51 | 1.5 | 17.5 |
| 0.6 | 7 | 25 | 14 | 7 | 53 | 1.5 | 17.4 |
| 0.7 | 8 | 30 | 15 | 8 | 61 | 1.6 | 17.6 |
| 0.5 | 7 | 25 | 12 | 7 | 51 | 1.4 | 17.6 |
| 0.6 | 10 | 25 | 13 | 7 | 55 | 1.5 | 17.8 |
| 0.6 | 7 | 20 | 14 | 8 | 49 | 1.4 | 18 |
| 0.5 | 8 | 30 | 15 | 7 | 60 | 1.3 | 18.3 |
| 0.5 | 7 | 25 | 15 | 8 | 55 | 1.2 | 18.4 |
| 0.5 | 7 | 25 | 14 | 7 | 53 | 1.2 | 18.5 |
| 0.5 | 10 | 30 | 15 | 9 | 64 | 1.1 | 18.5 |
| 0.4 | 10 | 25 | 15 | 7 | 57 | 1 | 18.9 |
| 0.4 | 7 | 20 | 15 | 7 | 49 | 0.9 | 19.1 |

PERPENDICULAR MAGNETIC RECORDING MEDIUM

This application is based upon and claims the benefit of priority from Japanese Patent Application No. 2009-087759, filed on Mar. 31, 2009, and Japanese Patent Application No. 2010-077948, filed on Mar. 30, 2010, the disclosures of which are incorporated herein in their entirety by reference.

TECHNICAL FIELD

This invention relates to a perpendicular magnetic recording medium adapted to be mounted in a perpendicular magnetic recording HDD (hard disk drive) or the like.

BACKGROUND ART

Various information recording techniques have been developed following the increase in volume of information processing in recent years. Particularly, the areal recording density of a HDD using the magnetic recording technique has been increasing at an annual rate of about 100%. Recently, the information recording capacity exceeding 200 GB has been required per 2.5-inch magnetic recording medium adapted for use in a HDD or the like. In order to satisfy such a requirement, it is necessary to realize an information recording density exceeding 400 Gbits/inch$^2$.

In order to achieve the high recording density in a magnetic recording medium for use in a HDD or the like, the perpendicular magnetic recording system has been proposed in recent years. In a perpendicular magnetic recording medium for use in the perpendicular magnetic recording system, the easy magnetization axis of a magnetic recording layer is adjusted so as to be oriented in a direction perpendicular to the surface of a substrate. As compared with the conventional in-plane magnetic recording system, the perpendicular magnetic recording system can suppress a so-called thermal fluctuation phenomenon in which the thermal stability of a recorded signal is degraded due to superparamagnetism so that the recorded signal is lost, and thus is suitable for increasing the recording density.

As the perpendicular magnetic recording medium for use in the perpendicular magnetic recording system, a CoCrPt—SiO$_2$ perpendicular magnetic recording medium (see T. Oikawa et. al., IEEE Trans. Magn, vol. 38, 1976-1978 (2002)) is proposed because it exhibits high thermal stability and excellent recording characteristics. In this CoCrPt—SiO$_2$ perpendicular magnetic recording medium, a magnetic recording layer has a granular structure in which nonmagnetic grain boundaries where SiO$_2$ is segregated are formed between magnetic grains in the form of continuously grown columnar Co crystals with a hcp (hexagonal closest packed) structure, thereby achieving both miniaturization of the magnetic grains and an improvement in coercive force Hc. It is known that an oxide is used for forming nonmagnetic grain boundaries (nonmagnetic portions between magnetic grains), and it is proposed to use, for example, one of SiO$_2$, Cr$_2$O$_3$, TiO, TiO$_2$, and Ta$_2$O$_5$ (JP-A-2006-024346).

Following the increase in recording density of the magnetic recording medium described above, a magnetic head has also shifted from a thin film head to a magnetoresistive head (MR head) and to a giant magnetoresistive head (GMR head), wherein the flying height of the magnetic head from a substrate (magnetic recording medium) has been reduced from about 20 (nm) to about 5 (nm). By reducing the flying height (magnetic spacing) of the magnetic head from the magnetic recording medium in this manner, it has been possible to improve the spacing loss to increase the SNR (signal noise ratio) and thus to achieve a further increase in recording density.

However, while it has become possible to achieve the further increase in recording density by the magnetoresistive head or the giant magnetoresistive head, this type of magnetic head mounted with a magnetoresistive effect element has a problem of causing, as its inherent failure, a head crash or a thermal asperity failure.

The head crash is a failure in which a magnetic head is physically damaged due to its collision with a projection on the surface of a magnetic recording medium. The thermal asperity failure is a failure in which a read error occurs due to heating of a magnetoresistive effect element caused by adiabatic compression of air or contact between a magnetic head and the surface of a magnetic recording medium when the magnetic head passes a minute convex or concave shape on the surface of the magnetic recording medium while flying over it. Since either of the failures is caused by the surface state, i.e. the surface roughness, of the magnetic recording medium, the surface of the magnetic recording medium is required to have extremely high-level smoothness and flatness with respect to a magnetic head mounted with a magnetoresistive effect element.

SUMMARY OF THE INVENTION

Although the magnetic recording medium has been increased in recording density as described above, a further improvement in recording density is required for the future. As one means for achieving it, a reduction in flying height of a magnetic head is effective. However, as described above, as the flying height of the magnetic head is reduced, the head crash or the thermal asperity failure tends to occur more easily. Therefore, in order to realize the reduction in flying height of the magnetic head without causing such a failure to thereby achieve the further increase in recording density, it is necessary to improve the smoothness and flatness of the magnetic recording medium, i.e. to reduce the surface roughness of the magnetic recording medium.

However, it is known that, in the perpendicular magnetic recording medium, the roughness increases following the growth of films. Accordingly, it is understood that the surface roughness of the magnetic recording medium is affected by the states of respective boundary surfaces between layers formed over a substrate. As a result of intensive studies by the present inventors, it has been found that the roughness starts to increase from the boundary surface between a soft magnetic layer and a nonmagnetic pre-underlayer formed thereon. That is, it has been considered that since the boundary surface between the soft magnetic layer and the pre-underlayer is rough (roughness is large), layers formed over the pre-underlayer intensify such a rough state so that respective boundary surfaces between those layers gradually increase in roughness, thereby providing the finally increased surface roughness of a magnetic recording medium.

As one method for solving the above-mentioned problem, it is considered to reduce the thickness of an underlayer (Ru layer with a hcp structure) formed on the pre-underlayer (under a magnetic recording layer). However, if the thickness of the underlayer is simply reduced, the crystal orientation of the magnetic recording layer cannot be sufficiently aligned to cause a reduction in SNR. Therefore, the underlayer cannot be thoughtlessly reduced in thickness.

Further, there is a problem that if the roughness of the interface on the lower side of the magnetic recording layer becomes large, disturbance occurs in crystal orientation of the magnetic recording layer to impede an improvement in SNR. Therefore, the state is currently in a dilemma that it is difficult to improve the SNR even if the thickness of the underlayer is reduced or increased.

Under these circumstances, it is an object of this invention to provide a perpendicular magnetic recording medium that can achieve a further increase in recording density by reducing its surface roughness to achieve a reduction in flying height of a magnetic head while ensuring an excellent SNR.

The present inventors have made an intensive analysis for achieving the above-mentioned object and have found that there is a correlation between an interface state between a soft magnetic layer and a pre-underlayer and electromagnetic conversion characteristics such as SNR. That is, it has been found that, in order to achieve the above-mentioned object, it is necessary to reduce the surface roughness of a soft magnetic layer and thus the roughness of the boundary surface (interface roughness) between the soft magnetic layer and a nonmagnetic pre-underlayer formed thereon.

Further, since the roughness increases as a crystalline coating film grows, it has been considered that there is an equilibrium between the interface roughnesses of respective boundary surfaces and the thicknesses of respective crystalline layers including a magnetic recording layer. In other words, it has been considered that the layer thickness can be set large if the interface roughness is small, while even if the interface roughness is large, the surface roughness can be suppressed by reducing the layer thickness.

In view of this, the present inventors have made further studies and found that, by setting the interface roughness between a soft magnetic layer and a pre-underlayer, the total thickness of crystalline layers, and the thickness of crystalline layers below a magnetic recording layer to predetermined ranges, it is possible to reduce the surface roughness of a magnetic recording medium and to obtain an excellent SNR, and have completed this invention.

According to an aspect of this invention, there is provided a perpendicular magnetic recording medium having, over a substrate, a magnetic recording layer for recording a signal, an underlayer made of Ru or a Ru compound and provided below the magnetic recording layer, a pre-underlayer made of a nonmagnetic crystalline material for controlling a crystal orientation of the underlayer, and a soft magnetic layer provided below the pre-underlayer, wherein when a difference between a highest point and a lowest point of unevenness of an interface between the soft magnetic layer and the pre-underlayer, derived by a cross-sectional TEM image, is given as an interface roughness (nm) and a distance between the soft magnetic layer and the magnetic recording layer, excluding the soft magnetic layer and the magnetic recording layer, is given as a SUL-MAG distance (nm), the interface roughness (nm)≤0.4 (nm)
and
the interface roughness (nm)×the SUL-MAG distance (nm)≤12 (nm) are satisfied. Hereinafter, the difference between the highest point (height of the highest convex portion) and the lowest point (height of the lowest concave portion) of the unevenness will be defined as a "roughness" in this invention and used as an index of the surface roughness and the interface roughness.

The interface roughness is a value representing the roughness of the boundary (interface) between the soft magnetic layer and the pre-underlayer. As this value decreases, the smoothness of the boundary between the soft magnetic layer and the pre-underlayer increases. In the above-mentioned configuration, by setting the roughness of the boundary between the soft magnetic layer and the pre-underlayer, i.e. the interface roughness, to 0.4 (nm) or less, the surface roughness of the magnetic recording medium due to such an interface state is reduced. Therefore, it is possible to achieve a reduction in flying height of a magnetic head and thus a further increase in recording density. Further, since the interface roughness between the soft magnetic layer and the pre-underlayer is reduced, the roughnesses of the boundary surfaces between the layers formed over the pre-underlayer are also reduced and, therefore, it is possible to improve the crystal orientation of those layers and thus to ensure an excellent SNR.

The SUL-MAG distance is a distance between the soft magnetic layer and the magnetic recording layer, excluding these layers, i.e. a distance from an upper surface of the soft magnetic layer to a lower surface of the magnetic recording layer (distance from a lower surface of the pre-underlayer to an upper surface of the underlayer). As the SUL-MAG distance becomes smaller, the surface roughness of the underlayer is reduced and, therefore, the interface roughness of the layer formed over the underlayer is reduced so that the surface roughness of the magnetic recording medium is reduced. Therefore, by adjusting the interface roughness and the SUL-MAG distance so that the product of these factors satisfies the above-mentioned range, it is possible to reduce the surface roughness of the magnetic recording medium and thus to ensure a high SNR.

According to another aspect of this invention, there is provided a perpendicular magnetic recording medium having, over a substrate, a magnetic recording layer for recording a signal, an auxiliary recording layer provided above the magnetic recording layer and having a magnetic interaction with the magnetic recording layer, an underlayer made of Ru or a Ru compound and provided below the magnetic recording layer for controlling a crystal orientation of the magnetic recording layer, a pre-underlayer made of a nonmagnetic crystalline material for controlling a crystal orientation of the underlayer, and a soft magnetic layer provided below the pre-underlayer, wherein when a difference between a highest point and a lowest point of unevenness of an interface between the soft magnetic layer and the pre-underlayer is given as an interface roughness (nm) and a distance from the pre-underlayer to the auxiliary recording layer, including the pre-underlayer and the auxiliary recording layer, is given as a crystalline total thickness (nm), the interface roughness (nm)≤0.4 (nm)
and
the interface roughness (nm)×the crystalline total thickness (nm)≤21 (nm)
are satisfied.

The interface roughness is as described above. The crystalline total thickness is a distance from the pre-underlayer to the auxiliary recording layer, including these layers, i.e. the total thickness of the pre-underlayer, the underlayer, the magnetic recording layer, and the auxiliary recording layer (distance from a lower surface of the pre-underlayer to an upper surface of the auxiliary recording layer). Specifically, the pre-underlayer, the underlayer, the magnetic recording layer, and the auxiliary recording layer are all in the form of crystalline coating films and each have a crystal orientation in which crystal grains are regularly oriented. Since the crystal grains of the respective layers are continuously grown, the interface roughness gradually increases as the total thickness of these layers increases, so that, finally, the surface roughness of the magnetic recording medium increases. Therefore, by reducing the crystalline total thickness to an extent that does not lower the functions of the respective layers, it is possible to prevent an increase in surface roughness of the magnetic recording medium. Therefore, by adjusting the interface roughness and the crystalline total thickness so that the product of these factors satisfies the above-mentioned range, it is possible to reduce the surface roughness of the magnetic recording medium and thus to ensure a high SNR.

The pre-underlayer may be made of NiW. This makes it possible to properly improve the corrosion resistance and the magnetic properties of the pre-underlayer.

Alternatively, the pre-underlayer may be a layer in which a layer made of crystalline NiW is formed on a layer made of amorphous NiTa or amorphous CrTa.

Grains of an amorphous material have no crystal structure. Therefore, a layer made of the amorphous material is irregularly formed on the soft magnetic layer. Therefore, according to the above-mentioned configuration, it is possible, by the layer made of amorphous NiTa or amorphous CrTa, to smooth the surface of the soft magnetic layer to thereby reduce the surface roughness of the soft magnetic layer and thus the interface roughness (boundary roughness) of the layer formed on the soft magnetic layer. By the layer made of crystalline NiW, it is possible to ensure the corrosion resistance and the magnetic properties of the pre-underlayer.

According to this invention, it is possible to provide a perpendicular magnetic recording medium that can achieve a further increase in recording density by reducing its surface roughness to achieve a reduction in flying height of a magnetic head while ensuring an excellent SNR.

MODE FOR CARRYING OUT THE INVENTION

Hereinbelow, a preferred embodiment of this invention will be described in detail with reference to the accompanying drawings. Sizes, materials, specific numerical values, and so on shown in the embodiment are only for illustrative purposes for facilitating understanding of the invention and are not intended to limit this invention unless otherwise specified. In this specification and the drawings, components having substantially the same functions and structures are assigned the same symbols to thereby omit duplicate explanation and, further, illustration of components that is not directly related to this invention is omitted.

Embodiment

[Perpendicular Magnetic Recording Medium]

Figure 1:
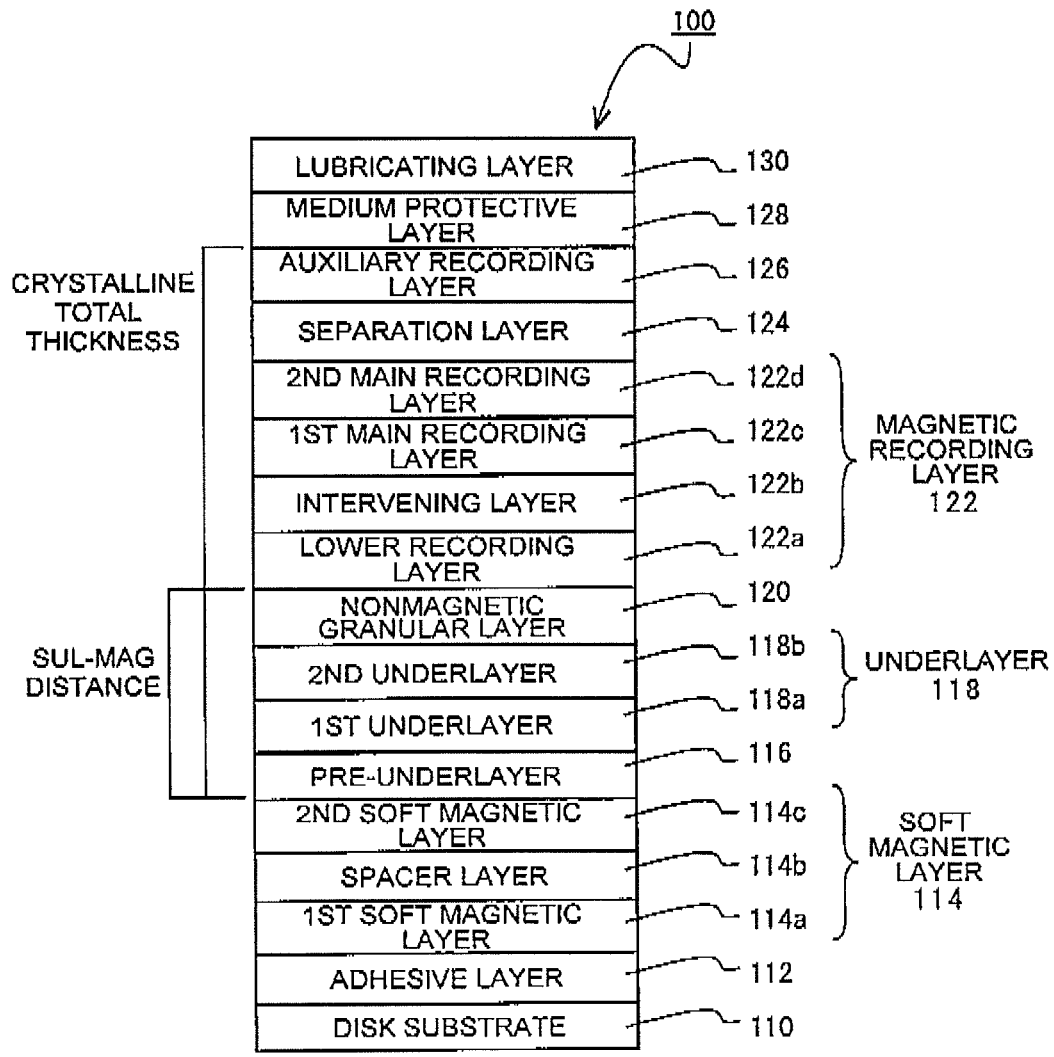
FIG. 1 is a diagram for explaining the structure of a perpendicular magnetic recording medium according to an embodiment of this invention.

FIG. 1 is a diagram for explaining the structure of a perpendicular magnetic recording medium 100 according to this embodiment. The perpendicular magnetic recording medium 100 shown in FIG. 1 comprises a disk substrate 110, an adhesive layer 112, a first soft magnetic layer 114a, a spacer layer 114b, a second soft magnetic layer 114c, a pre-underlayer 116, a first underlayer 118a, a second underlayer 118b, a nonmagnetic granular layer 120, a lower recording layer 122a, an intervening layer 122b, a first main recording layer 122c, a second main recording layer 122d, a separation layer 124, an auxiliary recording layer 126, a medium protective layer 128, and a lubricating layer 130. The first soft magnetic layer 114a, the spacer layer 114b, and the second soft magnetic layer 114c cooperatively form a soft magnetic layer 114. The first underlayer 118a and the second underlayer 118b cooperatively form an underlayer 118. The lower recording layer 122a, the intervening layer 122b, the first main recording layer 122c, and the second main recording layer 122d cooperatively form a magnetic recording layer 122.

As the disk substrate 110, use can be made of a glass disk obtained by molding an amorphous aluminosilicate glass into a disk shape by direct press. The kind, size, thickness, and so on of the glass disk are not particularly limited. As a material of the glass disk, use can be made of, for example, aluminosilicate glass, soda-lime glass, soda aluminosilicate glass, aluminoborosilicate glass, borosilicate glass, quartz glass, chain silicate glass, glass ceramic such as crystallized glass, or the like. This glass disk is ground, polished, and chemically strengthened in sequence, thereby obtaining the smooth nonmagnetic disk substrate 110 in the form of a chemically strengthened glass disk.

On the disk substrate 110, the layers from the adhesive layer 112 to the auxiliary recording layer 126 are formed in sequence by a DC magnetron sputtering method. The medium protective layer 128 can be formed by a CVD method. Thereafter, the lubricating layer 130 can be formed by a dip coating method. In terms of high productivity, it is also preferable to use an in-line type film forming method. Hereinbelow, the structures of the respective layers will be described.

The adhesive layer 112 is formed in contact with the disk substrate 110. The adhesive layer 112 has a function of increasing the peel strength between the soft magnetic layer 114 formed thereon and the disk substrate 110 and a function of miniaturizing and equalizing crystal grains of the respective layers formed over the soft magnetic layer 114. When the disk substrate 110 is made of amorphous glass, the adhesive layer 112 is preferably an amorphous alloy film for adaptation to the amorphous glass surface.

The adhesive layer 112 can be selected from, for example, a CrTi-based amorphous layer, a CoW-based amorphous layer, a CrW-based amorphous layer, a CrTa-based amorphous layer, and a CrNb-based amorphous layer. The adhesive layer 112 may be a single layer made of a single material, but, alternatively, may be formed by laminating a plurality of layers. For example, a CoW layer or a CrW layer may be formed on a CrTi layer. Preferably, the adhesive layer 112 is formed by sputtering a material containing carbon dioxide, carbon monoxide, nitrogen, or oxygen or is exposed to such a gas at its surface layer.

The soft magnetic layer 114 is a layer that temporarily forms a magnetic path during recording for causing the magnetic flux to pass through the recording layer in a perpendicular direction in the perpendicular magnetic recording system. By interposing the nonmagnetic spacer layer 114b between the first soft magnetic layer 114a and the second soft magnetic layer 114c, the soft magnetic layer 114 can be configured to have AFC (antiferromagnetic exchange coupling). With this configuration, magnetization directions of the soft magnetic layer 114 can be aligned along the magnetic path (magnetic circuit) with high accuracy and thus the perpendicular component in the magnetization direction is extremely reduced, so that it is possible to reduce noise generated from the soft magnetic layer 114. As the composition of the first soft magnetic layer 114a and the second soft magnetic layer 114c, use can be made of a cobalt-based alloy such as CoTaZr, a Co—Fe-based alloy such as CoCrFeB or CoFeTaZr, a Ni—Fe-based alloy like a [Ni—Fe/Sn] n multilayer structure, or the like.

The pre-underlayer 116 is a nonmagnetic alloy layer and has a function of protecting the soft magnetic layer 114 and a function of orienting, in a disk perpendicular direction, the easy magnetization axis of a hexagonal closest packed structure (hcp structure) included in the underlayer 118 formed thereon. It is preferable that, in the pre-underlayer 116, the (111) plane of a face-centered cubic structure (fcc structure) be parallel to the main surface of the disk substrate 110. The pre-underlayer 116 may have a structure in which such a crystal structure and an amorphous structure are mixed. As a material of the pre-underlayer 116, it can be selected from Ni, Cu, Pt, Pd, Zr, Hf, Nb, and Ta. Alternatively, it may be an alloy containing such a metal as a main component and one or more additional elements from Ti, V, Cr, Mo, and W. For example, it is possible to suitably select NiW, CuW, or CuCr as an alloy having a fcc structure.

In this embodiment, the interface roughness between the soft magnetic layer 114 and the pre-underlayer 116 is adjusted to 0.4 (nm) or less. Accordingly, the surface roughness of the perpendicular magnetic recording medium 100 due to the interface state between the soft magnetic layer 114 and the pre-underlayer 116 is reduced. Therefore, it is possible to achieve a reduction in flying height of a magnetic head and thus a further increase in recording density.

Further, since the interface roughness between the soft magnetic layer 114 and the pre-underlayer 116 is reduced, the roughnesses of the boundary surfaces between the layers formed over the pre-underlayer 116 are improved (reduced) and, therefore, it is possible to improve the crystal orientation of those layers and thus to ensure an excellent SNR.

The interface roughness is calculated by specifying a layer to be subjected to a calculation of roughness in a cross-sectional TEM image, measuring magnitudes of unevenness at predetermined positions therein, and deriving the average of the measured values. However, the interface roughness can be calculated by any other method as long as it can calculate the roughness of the interface (or the surface).

The underlayer 118 has a hcp structure and has a function of growing Co crystals with a hcp structure of the magnetic recording layer 122 into a granular structure. Therefore, as the crystal orientation of the underlayer 118 is enhanced, i.e. as the (0001) plane of crystals of the underlayer 118 becomes more parallel to the main surface of the disk substrate 110, it is possible to improve the orientation of the magnetic recording layer 122. A material of the underlayer 118 is typically Ru, but, alternatively, can be selected from RuCr and RuCo. Since Ru takes a hcp structure and has a crystal atomic interval close to that of Co, the magnetic recording layer 122 composed mainly of Co can be well oriented.

In the case where the material of the underlayer 118 is Ru, the underlayer 118 can have a two-layer structure made of Ru by changing the gas pressure during sputtering. Specifically, when forming the first underlayer 118a on the lower layer side, the gas pressure of Ar is set to a predetermined pressure, i.e. a low pressure, while when forming the second underlayer 118b on the upper layer side, the gas pressure of Ar is set higher than that for forming the first underlayer 118a on the lower layer side, i.e. set to a high pressure. This makes it possible to improve the crystal orientation of the magnetic recording layer 122 by the first underlayer 118a and to miniaturize magnetic grains of the magnetic recording layer 122 by the second underlayer 118b.

As the gas pressure increases, the mean free path of sputtering plasma ions decreases and thus the film forming rate decreases to make the film coarse, so that it is possible to facilitate separation and miniaturization of Ru crystal grains and thus to miniaturize the Co crystal grains.

A very small amount of oxygen may be added to Ru of the underlayer 118. This makes it possible to further facilitate the separation and miniaturization of the Ru crystal grains and thus to achieve further isolation and miniaturization of the Co crystal grains of the magnetic recording layer 122. Accordingly, in this embodiment, oxygen is contained in the second underlayer, formed just under the magnetic recording layer 122, of the underlayer 118 having the two-layer structure. That is, the second underlayer is made of RuO. By this, the above-mentioned advantage can be obtained most effectively. Oxygen may be added by reactive sputtering, but it is preferable to use a target containing oxygen in sputtering film formation.

The nonmagnetic granular layer 120 is a nonmagnetic layer having a granular structure. By forming the nonmagnetic granular layer 120 on the hcp crystal structure of the underlayer 118 and by growing a granular layer of the lower recording layer 122a (i.e. of the entire magnetic recording layer 122) thereon, the nonmagnetic granular layer 120 has a function of separating the magnetic granular layer from an initial growth stage (buildup). By this, it is possible to facilitate isolation of the magnetic grains of the magnetic recording layer 122. The composition of the nonmagnetic granular layer 120 can have a granular structure by segregating a nonmagnetic substance to form grain boundaries between nonmagnetic crystal grains made of a Co-based alloy.

In this embodiment, the nonmagnetic granular layer 120 is made of CoCr—$SiO_2$. Accordingly, $SiO_2$ (nonmagnetic substance) is segregated to form grain boundaries between Co-based alloy crystal grains (nonmagnetic crystal grains) so that the nonmagnetic granular layer 120 has a granular structure. CoCr—$SiO_2$ is only one example and may be replaced by another. For example, CoCrRu—$SiO_2$ can be suitably used instead. Further, instead of Ru, use can be made of Rh (rhodium), Pd (palladium), Ag (silver), Os (osmium), Ir (iridium), or Au (gold). The nonmagnetic substance may be any substance as long as it is a substance that can form grain boundary portions around magnetic grains so as to suppress or block the exchange interaction between the magnetic grains and that may be a nonmagnetic substance which is not solid-soluble to cobalt (Co). For example, silicon oxide ($SiO_x$), chromium (Cr), chromium oxide ($Cr_2O_3$), titanium oxide ($TiO_2$), zirconium oxide ($ZrO_2$), and tantalum oxide ($Ta_2O_5$) can be given as examples.

In this embodiment, the nonmagnetic granular layer 120 is provided on the underlayer 118 (second underlayer 118b), but not limited thereto. The perpendicular magnetic recording medium 100 can be fabricated without providing the nonmagnetic granular layer 120.

The magnetic recording layer 122 has a columnar granular structure in which a nonmagnetic substance is segregated to form grain boundaries around magnetic grains of a hard magnetic substance selected from a Co-based alloy, a Fe-based alloy, and a Ni-based alloy. By providing the nonmagnetic granular layer 120, these magnetic grains can be epitaxially grown continuously from the granular structure thereof. In this embodiment, the magnetic recording layer 122 comprises the lower recording layer 122a, the intervening layer 122b, the first main recording layer 122c, and the second main recording layer 122d. Accordingly, small crystal grains of the first main recording layer 122c and the second main recording layer 122d are grown continuously from crystal grains (magnetic grains) of the lower recording layer 122a so that it is possible to achieve miniaturization of the crystal grains of the main recording layers and thus to improve the SNR.

In this embodiment, the lower recording layer 122a is made of CoCrPt—$Cr_2O_5$—$SiO_2$. CoCrPt—$Cr_2O_5$—$SiO_2$ forms a granular structure in which $Cr_2O_5$ and $SiO_2$ (oxides) being nonmagnetic substances are segregated to form grain boundaries around magnetic grains made of CoCrPt and grown into a columnar shape. These magnetic grains are epitaxially grown continuously from the granular structure of the nonmagnetic granular layer 120.

The intervening layer 122b is a nonmagnetic thin film. By interposing the intervening layer 122b between the lower recording layer 122a and the first main recording layer 122c, the magnetic continuity therebetween is separated. By setting the thickness of the intervening layer 122b to a predetermined thickness (0.7 nm to 0.9 nm), AFC (antiferromagnetic exchange coupling) occurs between the lower recording layer 122a and the first main recording layer 122c. Accordingly, since magnetizations interact with each other between the layers on the upper and lower sides of the intervening layer 122b so as to mutually fix the magnetization direction, it is possible to reduce the fluctuation of the magnetization axis and thus to reduce noise.

The intervening layer 122b is preferably made of Ru or a Ru compound. This is because since the atomic interval of Ru is close to that of Co forming the magnetic grains, even if it is interposed in the magnetic recording layer 122, the epitaxial growth of the Co crystal grains is hardly impeded. The extremely thin thickness of the intervening layer 122b also contributes to the difficulty in impeding the epitaxial growth.

Herein, if the intervening layer 122b is not provided, the lower recording layer 122a serves as a magnet continuous with the first main recording layer 122c and the second main recording layer 122d, but, in this embodiment, because of being separated by the intervening layer 122b, the lower recording layer 122a serves as an individual short magnet. Further, by reducing the thickness of the lower recording layer 122a, the aspect ratio of the granular magnetic grains decreases (in the perpendicular magnetic recording medium 100, the film thickness direction corresponds to the longitudinal direction of the easy magnetization axis) so that the demagnetization field generated inside the magnet is intensified. Therefore, although the lower recording layer 122a is hard magnetic, the magnetic moment exhibited outside is so small that it is difficult for a magnetic head to pick up the magnetic flux. That is, by adjusting the thickness of the lower recording layer 122a to set its magnetization (strength of the magnet) so that the magnetic flux hardly reaches the magnetic head while the lower recording layer 122a has a magnetic interaction with the first main recording layer 122c, it is possible to provide the magnetic recording layer with small noise while exhibiting a high coercive force.

In this embodiment, the first main recording layer 122c is made of CoCrPt—$SiO_2$—$TiO_2$. Accordingly, also in the first main recording layer 122c, a granular structure is formed in which $SiO_2$ and $TiO_2$ (composite oxides) being nonmagnetic substances are segregated to form grain boundaries around magnetic grains made of CoCrPt and grown into a columnar shape.

In this embodiment, the second main recording layer 122d is continuous with the first main recording layer 122c, but differs from the first main recording layer 122c in composition and thickness. The second main recording layer 122d is made of CoCrPt—$SiO_2$—$TiO_2$—$Co_3O_4$. Accordingly, also in the second main recording layer 122d, a granular structure is formed in which $SiO_2$, $TiO_2$, and $Co_3O_4$ (composite oxides) being nonmagnetic substances are segregated to form grain boundaries around magnetic grains made of CoCrPt and grown into a columnar shape.

As described above, in this embodiment, the second main recording layer 122d contains more oxides than the first main recording layer 122c. This makes it possible to facilitate separation of the crystal grains stepwise from the first main recording layer 122c to the second main recording layer 122d.

Further, as described above, the second main recording layer 122d contains Co oxide. There is a fact that the incorporation of $SiO_2$ or $TiO_2$ as an oxide causes oxygen deficiency, wherein Si ions or Ti ions are incorporated into magnetic grains to disturb the crystal orientation so that the coercive force Hc is lowered. Accordingly, by the incorporation of Co oxide, the Co oxide can function as an oxygen carrier for making up for the oxygen deficiency. $Co_3O_4$ is exemplified as the Co oxide, but CoO may be used instead.

The Co oxide has a larger Gibbs free energy $\Delta G$ than $SiO_2$ or $TiO_2$ so that Co ions and oxygen ions tend to be separated from each other. Therefore, oxygen is preferentially separated from the Co oxide and makes up for oxygen deficiency generated in $SiO_2$ or $TiO_2$ so that Si ions or Ti ions can be completed as an oxide and deposited at the grain boundaries. Accordingly, it is possible to prevent the incorporation of a foreign substance such as Si or Ti into the magnetic grains and thus to prevent the disturbance of crystallinity of the magnetic grains otherwise caused by the incorporation thereof. It is considered that excess Co ions are incorporated into the magnetic grains. However, since the magnetic grains are made of the Co alloy, the magnetic properties thereof are not degraded by the incorporated Co ions. Therefore, it is possible to improve the crystallinity and the crystal orientation of the magnetic grains and thus to enhance the coercive force Hc. Further, since the saturation magnetization Ms is improved, there is an advantage that the overwrite characteristics are also improved.

However, if the Co oxide is incorporated into the magnetic recording layer 122, there is a problem that the SNR is reduced. Therefore, by providing the first main recording layer 122c incorporating no Co oxide as described above, it is possible to obtain high coercive force Hc and excellent overwrite characteristics by the second main recording layer 122d while ensuring high SNR by the first main recording layer 122c. The thickness of the second main recording layer 122d is preferably greater than that of the first main recording layer 122c and, as one suitable example, the first main recording layer 122c can be set to 2 (nm) in thickness and the second main recording layer 122d can be set to 8 (nm) in thickness.

The above-mentioned substances used in the lower recording layer 122a, the first main recording layer 122c, and the second main recording layer 122d are only examples and may be replaced by others. As the nonmagnetic substance for forming the grain boundaries, oxides such as silicon oxide (SiOx), chromium (Cr), chromium oxide ($Cr_xO_y$), titanium oxide ($TiO_2$), zirconium oxide ($ZrO_2$), tantalum oxide ($Ta_2O_5$), iron oxide ($Fe_2O_3$), and boron oxide ($B_2O_3$) can be given as examples. Alternatively, a nitride such as BN or a carbide such as $B_4C_3$ can be suitably used.

In this embodiment, use is made of two kinds of nonmagnetic substances (oxides) in the lower recording layer 122a and the first main recording layer 122c and three kinds of them in the second main recording layer 122d, but not limited thereto. For example, in any or all of the lower recording layer 122a to the second main recording layer 122d, one kind of nonmagnetic substance may be used or two or more kinds of nonmagnetic substances may be combined and used. There is no particular limitation to the kind of nonmagnetic substance to be contained, but it is preferable to contain particularly $SiO_2$ and $TiO_2$ as in this embodiment. Therefore, in the case where the lower recording layer 122a to the second main recording layer 122d are formed by a single layer (in the case where the intervening layer 122b is not provided) as is different from this embodiment, such a magnetic recording layer is preferably made of $CoCrPt$—$SiO_2$—$TiO_2$.

The separation layer 124 is a nonmagnetic layer provided between the magnetic recording layer 122 (second main recording layer 122d) and the auxiliary recording layer 126. The separation layer 124 is formed to be thicker than the intervening layer 122b. Thus, ferromagnetic exchange coupling, not antiferromagnetic exchange coupling, occurs as a magnetic effect between the magnetic recording layer 122 and the auxiliary recording layer 126. Accordingly, the magnetic recording layer 122 serves as a pinning layer (magnetization direction fixing layer) for the auxiliary recording layer 126 so that it is possible to reduce noise caused by the auxiliary recording layer 126 and thus to improve the SNR.

In this embodiment, the separation layer 124 can be formed by a thin film containing Ru, a Ru compound, Ru and oxygen, or Ru and an oxide. This also makes it possible to reduce noise caused by the auxiliary recording layer 126. This is considered to be because when forming the separation layer 124, oxygen to be contained in the separation layer 124 is segregated on the oxides of the magnetic recording layer 122 and Ru is segregated on the magnetic grains so that the Co crystal structure of the magnetic recording layer 122 can be inherited to Co of the auxiliary recording layer 126.

As the oxide to be contained in Ru of the separation layer 124, various oxides can be considered. However, by the use of particularly an oxide of W, Ti, or Ru, it is possible to improve the electromagnetic conversion characteristics (SNR). For example, the separation layer 124 may be made of RuO, $RuWO_3$, or $RuTiO_2$. Among them, a high effect can be obtained with $WO_3$.

This is considered to be because oxygen contained in Ru is dissociated during sputtering and the dissociated oxygen also exhibits the effect of addition of oxygen. That is, by the use of $WO_3$, it is possible to have both the effect of addition of oxygen and the effect of addition of the oxide, which is thus preferable. As other examples of oxides, oxides such as silicon oxide (SiOx), chromium (Cr), chromium oxide ($Cr_xO_Y$), titanium oxide ($TiO_2$), zirconium oxide ($ZrO_2$), tantalum oxide ($Ta_2O_5$), iron oxide ($Fe_2O_3$), and boron oxide ($B_2O_3$) can be given as examples. Alternatively, a nitride such as BN or a carbide such as $B_4C_3$ can be suitably used.

The auxiliary recording layer 126 is a magnetic layer magnetically almost continuous in the in-plane direction of the main surface of the substrate. It is necessary that the auxiliary recording layer 126 be adjacent to or in vicinity to the magnetic recording layer 122 so as to have a magnetic interaction therewith. A material of the auxiliary recording layer 126 may be, for example, CoCrPt, CoCrPtB, or a substance containing a very small amount of an oxide in CoCrPt or CoCrPtB. The auxiliary recording layer 126 has the purpose of adjusting the reversed domain nucleation magnetic field Hn and the coercive force Hc, thereby achieving an improvement in anti-thermal fluctuation characteristics, OW characteristics, and SNR. In order to achieve this purpose, the auxiliary recording layer 126 preferably has high perpendicular magnetic anisotropy Ku and high saturation magnetization Ms. The auxiliary recording layer 126 is provided above the magnetic recording layer 122 in this embodiment, but may alternatively be provided below the magnetic recording layer 122.

A term of "magnetically continuous" means that the magnetism continues. A term of "almost continuous" means to include the case where the auxiliary recording layer 126 is not a single magnet when observed in its entirety so that the magnetism may be discontinuous due to grain boundaries of crystal grains or the like. The grain boundary not only represents the discontinuity of a crystal, but also may be formed by segregation of Cr or by segregation of an oxide contained in a very small amount. Even if grain boundaries containing the oxide are formed in the auxiliary recording layer 126, the area of the grain boundaries is preferably smaller (the content of the oxide is lower) than that of the grain boundaries of the magnetic recording layer 122. The function and operation of the auxiliary recording layer 126 are not necessarily clear, but it is considered that the auxiliary recording layer 126 has a magnetic interaction (performs exchange coupling) with the granular magnetic grains of the magnetic recording layer 122 so that it is possible to adjust Hn and Hc and thus to improve the anti-thermal fluctuation characteristics and the SNR. Further, it is considered that since the area of the crystal grains (crystal grains having a magnetic interaction) connected to the granular magnetic grains is greater than cross section of the granular magnetic grains, magnetization reversal tends to occur due to reception of much magnetic flux from a magnetic head, thereby improving the OW characteristics of the whole.

In this embodiment, when the difference between the highest point and the lowest point of unevenness of the interface between the soft magnetic layer 114 and the pre-underlayer 116 is given as an interface roughness (nm), adjustment is carried out to satisfy interface roughness (nm)×crystalline total thickness (nm)≤21. This makes it possible to reduce the surface roughness of the perpendicular magnetic recording medium 100 and thus to ensure a high SNR without lowering the functions of the crystalline layers, i.e. the pre-underlayer 116, the underlayer 118, the nonmagnetic granular layer 120, the magnetic recording layer 122, and the auxiliary recording layer 126.

If the pre-underlayer 116 is formed by two layers, i.e. an amorphous layer on the disk substrate 110 side and a crystalline layer disposed thereon, the pre-underlayer 116 on the disk substrate 110 side is not added to the crystalline total thickness. This is because the roughness of the lower side interface is increased when a coating film is crystalline, while the roughness of the lower side interface is rather reduced when a coating film is amorphous.

Further, in this embodiment, when the difference between the highest point and the lowest point of unevenness of the interface between the soft magnetic layer 114 and the pre-underlayer 116 is given as an interface roughness (nm) and the distance between the soft magnetic layer 114 and the magnetic recording layer 122, excluding these layers, is given as a SUL-MAG distance (nm), these factors are adjusted so as to satisfy interface roughness (nm)×SUL-MAG distance (nm)≤12 (nm). This makes it possible to reduce the surface roughness of the perpendicular magnetic recording medium 100 caused by the thickness of the layers present between the soft magnetic layer 114 and the magnetic recording layer 122, and thus to ensure a high SNR.

If a layer other than the pre-underlayer 116 and the underlayer 118 is present between the soft magnetic layer 114 and the magnetic recording layer 122, the thickness of such a layer is naturally included in the SUL-MAG distance. Further, if one of the pre-underlayer 116 and the underlayer 118 is not provided, it is needless to say that the SUL-MAG distance becomes equal to the thickness of the other of the layers 116 and 118.

In this embodiment, since the nonmagnetic granular layer 120 is provided between the soft magnetic layer 114 and the magnetic recording layer 122, the thickness of the nonmagnetic granular layer 120 is included in the SUL-MAG distance. However, if the nonmagnetic granular layer 120 is not provided, the thickness thereof is not included in the SUL-MAG distance.

The medium protective layer 128 can be formed by film formation of carbon by the CVD method while maintaining a vacuum. The medium protective layer 128 is a layer for protecting the perpendicular magnetic recording medium 100 from an impact of a magnetic head. Since, in general, carbon formed into a film by the CVD method is improved in film hardness as compared with that by the sputtering method, it is possible to protect the perpendicular magnetic recording medium 100 more effectively against the impact from the magnetic head.

The lubricating layer 130 can be formed of PFPE (perfluoropolyether) by the dip coating method, PFPE has a long chain molecular structure and is bonded to N atoms on the surface of the medium protective layer 128 with high affinity. By the function of this lubricating layer 130, even if the magnetic head is brought into contact with the surface of the perpendicular magnetic recording medium 100, it is possible to prevent damage or breakage of the medium protective layer 128.

By the above-mentioned manufacturing processes, the perpendicular magnetic recording medium 100 can be obtained. Next, an Example of this embodiment will be described.

EXAMPLE

Using an evacuated film forming apparatus, the layers from the adhesive layer 112 to the auxiliary recording layer 126 were formed in sequence on the disk substrate 110 in an Ar atmosphere by a DC magnetron sputtering method. The composition of the adhesive layer 112 was CrTi. In the soft magnetic layer 114, the composition of the first soft magnetic layer 114a and the second soft magnetic layer 114c was CoFeTaZr and the composition of the spacer layer 114b was Ru. The composition of the pre-underlayer 116 was NiW. As the first underlayer 118a, a Ru film was formed in an Ar atmosphere at a predetermined pressure (low pressure: e.g. 0.6 Pa to 0.7 Pa). As the second underlayer 118b, a Ru (RuO) film containing oxygen was formed, using a target containing oxygen, in an Ar atmosphere at a pressure (high pressure: e.g. 4.5 Pa to 7 Pa) higher than the predetermined pressure. The composition of the nonmagnetic granular layer 120 was nonmagnetic $CoCr$—$SiO_2$. In the lower recording layer 122a, grain boundary portions contain $Cr_2O_5$ and $SiO_2$ as examples of oxides and a hcp crystal structure of $CoCrPt$—$Cr_2O_5$—$SiO_2$ was formed. The intervening layer 122b was formed of Ru. In the first main recording layer 122c, grain boundary portions contain $SiO_2$ and $TiO_2$ as examples of composite oxides (a plurality of kinds of oxides) and a hcp crystal structure of $CoCrPt$—$SiO_2$—$TiO_2$ was formed. In the second main recording layer 122d, grain boundary portions contain $SiO_2$, $TiO_2$, and $Co_3O_4$ as examples of composite oxides (a plurality of kinds of oxides) and a hcp crystal structure of $CoCrPt$—$SiO_2$—$TiO_2$—$Co_3C_4$ was formed. The separation layer 124 was formed of $RuWO_3$. The composition of the auxiliary recording layer 126 was CoCrPtB. The medium protective layer 128 was formed using $C_2H_4$ and CN by the CVD method. The lubricating layer 130 was formed using PFPE by the dip coating method.

Hereinbelow, the correlation between respective factors, i.e. the interface roughness between the soft magnetic layer 114 and the pre-underlayer 116, interface roughness×SUL-MAG distance, and interface roughness×crystalline total thickness, and the surface roughness of the perpendicular magnetic recording medium 100 and the SNR will be described with reference to the drawings. A straight line or a curve in the drawings is an approximate curve with respect to plotted measured data.

Figures 2A, 2B:
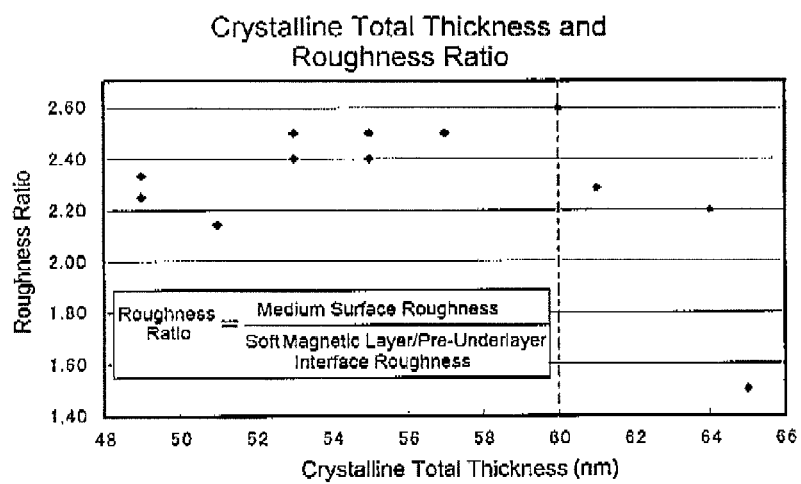
FIGS. 2A and 2B show diagrams respectively illustrating the relationship between the interface roughness and the SNR and the relationship between the crystalline total thickness and the roughness ratio.

FIGS. 2A and 2B show diagrams respectively illustrating the relationship between the interface roughness and the SNR and the relationship between the crystalline total thickness and the roughness ratio. FIG. 2A is a diagram illustrating changes in SNR according to the interface roughness between the soft magnetic layer 114 and the pre-underlayer 116 and FIG. 2B is a diagram illustrating changes in roughness ratio of the perpendicular magnetic recording medium 100 according to the crystalline total thickness. In FIG. 2B, the ordinate axis represents a value obtained by dividing the surface roughness of the medium (perpendicular magnetic recording medium 100) by the interface roughness between the soft magnetic layer 114 and the pre-underlayer 116 (hereinafter, this value will be referred to as a "roughness ratio").

As shown in FIG. 2A, the SNR decreases as the interface roughness between the soft magnetic layer 114 and the pre-underlayer 116 increases. This is considered to be because if the interface roughness between the soft magnetic layer 114 and the pre-underlayer 116 is high, the roughnesses of the boundary surfaces between the layers formed over the soft magnetic layer 114 increase so that the crystal orientation is disturbed. Therefore, it is preferable that the interface roughness between the soft magnetic layer 114 and the pre-underlayer 116 be as low as possible. It is seen that if this value is set to 0.4 (nm) or less, an extremely high SNR can be ensured.

From FIG. 2B, it is seen that the crystalline total thickness affects the roughness from the interface between the soft magnetic layer 114 and the pre-underlayer 116 to the surface of the medium. The roughness ratio represents an increase in roughness as its value increases. Referring to FIG. 2B, since the roughness ratio increases in proportion to an increase in crystalline total thickness, it can be understood that if the crystalline total thickness is large, the roughnesses of the respective interfaces from the pre-underlayer 116 to the surface of the medium increase correspondingly. Therefore, the crystalline total thickness is preferably minimized as long as the functions of the respective layers are not degraded, and is preferably set to 60 (nm) or less.

Figure 3A:
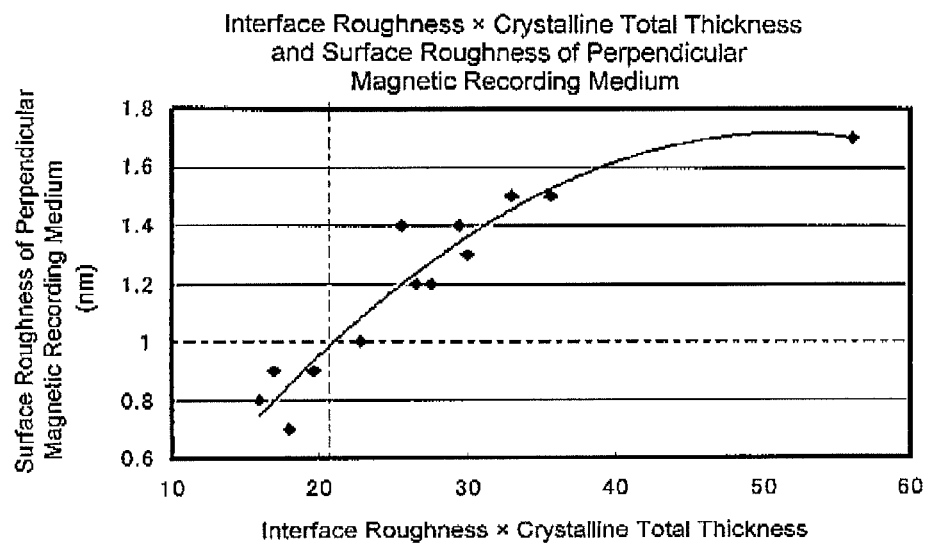
FIGS. 3A and 3B show diagrams respectively illustrating changes in surface roughness of a perpendicular magnetic recording medium and in SNR, according to interface roughness×crystalline total thickness.
Figure 3B:
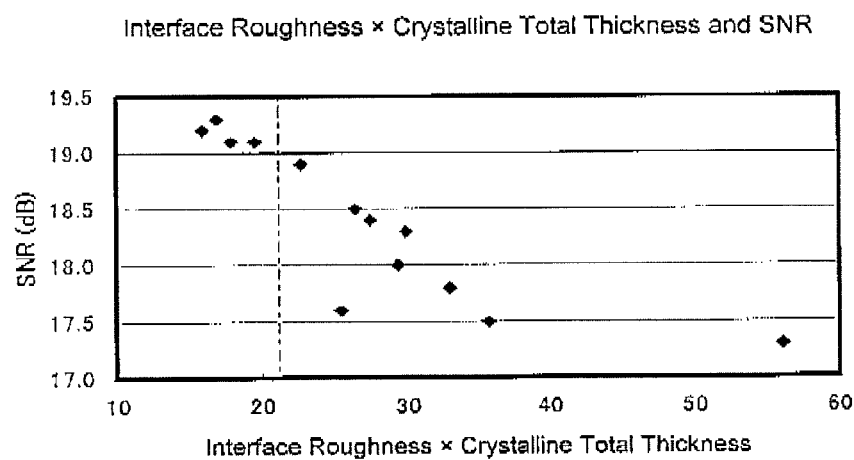

FIGS. 3A and 3B show diagrams respectively illustrating changes in surface roughness of the perpendicular magnetic recording medium 100 and in SNR, according to interface roughness×crystalline total thickness. FIG. 3A is a diagram illustrating changes in surface roughness of the perpendicular magnetic recording medium 100 according to interface roughness×crystalline total thickness and FIG. 3B is a diagram illustrating changes in SNR according to interface roughness×crystalline total thickness.

As described above, if the crystalline total thickness is large, the interface roughness is increased to increase the roughness of the medium surface, while if the interface roughness is small, even if the crystalline total thickness is large, the roughness of the medium surface is low and, conversely, if the interface roughness is large, even if the crystalline total thickness is thin, the roughness of the medium surface becomes large. Accordingly, in FIG. 3A, in order to take into account mutual influences of these factors, the medium is evaluated by multiplying the interface roughness and the crystalline total thickness together.

As also described above, in order to achieve a further reduction in flying height of a magnetic head, the surface roughness of the perpendicular magnetic recording medium 100 is preferably set to 1 (nm) or less. Referring to FIG. 3A, when interface roughness×crystalline total thickness becomes 21 or less, the surface roughness of the perpendicular magnetic recording medium 100 becomes 1 (nm) or less. Therefore, if the interface roughness and the crystalline total thickness satisfy the relation formula of "interface roughness×crystalline total thickness≤21", the surface roughness of the perpendicular magnetic recording medium 100 is reduced and thus the further reduction in flying height of the magnetic head is enabled.

Referring to FIG. 3B, it is seen that if interface roughness× crystalline total thickness is set to 21 or less, a high SNR of about 18.8 dB or more can be ensured. Therefore, by setting interface roughness×crystalline total thickness to 21 or less, the further reduction in flying height of the magnetic head due to the reduction in surface roughness of the perpendicular magnetic recording medium 100 can be achieved as described above and, further, the high SNR can be ensured, so that it is possible to achieve a further increase in recording density of the perpendicular magnetic recording medium 100.

Figure 4A:
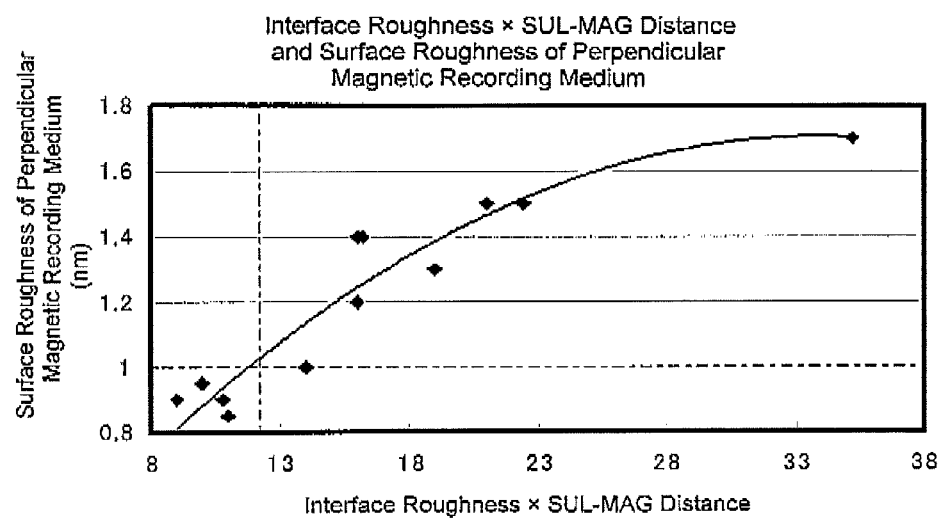
FIGS. 4A and 4B show diagrams respectively illustrating changes in surface roughness of a perpendicular magnetic recording medium and in SNR, according to interface roughness×SUL-MAG distance.
Figure 4B:
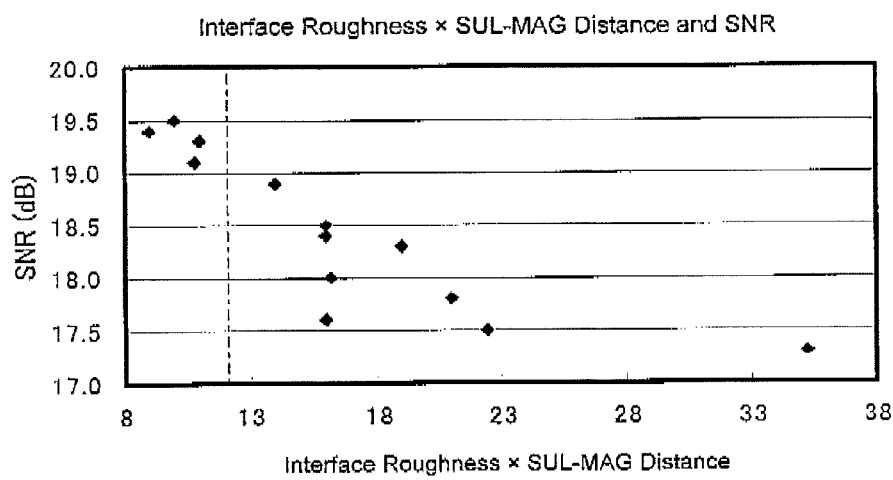

FIGS. 4A and 4B show diagrams respectively illustrating changes in surface roughness of the perpendicular magnetic recording medium 100 and in SNR, according to interface roughness×SUL-MAG distance. FIG. 4A is a diagram illustrating changes in surface roughness of the perpendicular magnetic recording medium 100 according to interface roughness×SUL-MAG distance and FIG. 4B is a diagram illustrating changes in SNR according to interface roughness×SUL-MAG distance.

The SUL-MAG distance is the total thickness of the crystalline layers located below the magnetic recording layer 122. If the roughness of the interface, on the substrate side, of the magnetic recording layer 122 is large, the magnetic recording layer 122 is affected thereby so that the crystal orientation is degraded in the magnetic recording layer 122. Accordingly, by multiplying together the interface roughness between the soft magnetic layer 114 and the pre-underlayer 116 and the SUL-MAG distance, the influence exerted on the magnetic recording layer 122 is evaluated.

As described above, the surface roughness of the perpendicular magnetic recording medium 100 required for the further reduction in flying height of the magnetic head is 1 (nm) or less. Referring to FIG. 4A, when interface roughness× SUL-MAG distance becomes 12 (nm) or less, the surface roughness of the perpendicular magnetic recording medium 100 becomes 1 (nm) or less. Therefore, if the interface roughness and the SUL-MAG distance satisfy the relation formula of "interface roughness×SUL-MAG distance≤12", the surface roughness of the perpendicular magnetic recording medium 100 is reduced and thus the further reduction in flying height of the magnetic head is enabled.

Referring to FIG. 4B, it is seen that if interface roughness× SUL-MAG distance is set to 12 or less, a high SNR can be ensured. Therefore, the high SNR can be ensured while achieving the further reduction in flying height of the magnetic head, so that it is possible to extremely improve the recording density of the perpendicular magnetic recording medium 100.

As described above, according to this invention, it is possible to improve the surface roughness of the perpendicular magnetic recording medium 100 caused by the interface roughness between the soft magnetic layer 114 and the pre-underlayer 116. Accordingly, it is possible to achieve a reduction in flying height of a magnetic head and thus a further increase in recording density. Further, since the interface roughness between the soft magnetic layer 114 and the pre-underlayer 116 is reduced, the roughnesses of the boundary surfaces between the layers formed over the pre-underlayer 116 are also reduced and, therefore, it is possible to improve the crystal orientation of those layers and thus to ensure an excellent SNR.

In this embodiment, the pre-underlayer 116 is formed on the soft magnetic layer 114, but not limited thereto. A layer may be interposed between the soft magnetic layer 114 and the pre-underlayer 116. The layer to be interposed is preferably a layer, for example, that is formed without applying a bias voltage to the disk substrate 110 during film formation. Accordingly, it is possible to reduce an impact on the soft magnetic layer 114 during formation of the pre-underlayer 116. Therefore, it becomes possible to prevent an increase in surface roughness of the soft magnetic layer 114 and thus to reduce the interface roughness (boundary roughness) of the layer formed on the soft magnetic layer 114.

As another example of a layer to be interposed between the soft magnetic layer 114 and the pre-underlayer 116, a layer made of an amorphous material is preferable. Since grains of the amorphous material have no crystal structure, the layer made of the amorphous material is irregularly formed on the soft magnetic layer 114. Therefore, it is possible to smooth the surface of the soft magnetic layer 114 to thereby reduce the surface roughness of the soft magnetic layer 114 and thus the interface roughness (boundary roughness) of the layer formed on the soft magnetic layer 114. Further, since an amorphous coating film has a higher hardness than a crystalline coating film, it becomes possible to suitably protect the soft magnetic layer 114 from an impact during formation of the pre-underlayer 116 by the use of the layer made of the amorphous material. Therefore, it is possible to achieve a further reduction in interface roughness between the soft magnetic layer 114 and the pre-underlayer 116.

As described above, by interposing the above-mentioned layer between the soft magnetic layer 114 and the pre-underlayer 116, it is possible to reduce the surface roughness of the soft magnetic layer 114 and thus the interface roughness (boundary roughness) of the layer formed on the soft magnetic layer 114. Therefore, it is possible to increase the SUL-MAG distance and the crystalline total thickness.

While the preferred embodiment of this invention has been described with reference to the accompanying drawings, it is needless to say that this invention is not limited thereto. It is apparent that a person skilled in the art can think of various changes and modifications in the category described in claims and it is understood that those also naturally belong to the technical scope of this invention.

Industrial Applicability

This invention can be used as a perpendicular magnetic recording medium adapted to be mounted in a perpendicular magnetic recording HDD or the like.

What is claimed is:

1. A perpendicular magnetic recording medium comprising:
   a substrate;
   over said substrate, a magnetic recording layer for recording a signal, an auxiliary recording layer provided above said magnetic recording layer and having a magnetic interaction with said magnetic recording layer, a separation layer comprising Ru or an Ru compound, a multilayer underlayer comprising Ru or a Ru compound and provided below said magnetic recording layer, said underlayer having a first underlayer on a lower layer side and a second underlayer on an upper layer side just under the magnetic recording layer, grains of said second underlayer being coarser than grains of said first underlayer, a multi-layer pre-underlayer made of a nonmagnetic crystalline material for controlling a crystal orientation of said underlayer, and a soft magnetic layer provided below said pre-underlayer, wherein when a difference between a highest point and a lowest point of unevenness of an interface between said soft magnetic layer and said multi-layer pre-underlayer, derived by a cross-sectional TEM image, is given as an interface roughness (nm) and a distance between said soft magnetic layer and said magnetic recording layer, excluding said soft magnetic layer and said magnetic recording layer, is given as a SUL-MAG distance (nm), said interface roughness (nm)<0.4(nm) and said interface roughness (nm)×said SUL-MAG distance (nm)<12(nm) are satisfied, wherein said separation layer comprises $WO_3$.

2. A perpendicular magnetic recording medium comprising:

a substrate;

over said substrate, a magnetic recording layer comprising oxides and magnetic grains for recording a signal, an auxiliary recording layer provided above said magnetic recording layer and having a magnetic interaction with said magnetic recording layer, a separation layer comprising Ru or a Ru compound in combination with oxygen, a multi-layer underlayer comprising Ru or a Ru compound and provided below said magnetic recording layer for controlling a crystal orientation of said magnetic recording layer, said underlayer having a first underlayer on a lower layer side and a second underlayer on an upper layer side just under the magnetic recording layer, grains of said second underlayer being coarser than grains of said first underlayer, a multi-layer pre-underlayer made of a nonmagnetic crystalline material for controlling a crystal orientation of said underlayer, and a soft magnetic layer provided below said pre-underlayer, wherein when a difference between a highest point and a lowest point of unevenness of an interface between said soft magnetic layer and said pre-underlayer is given as an interface roughness (nm) and a distance from said pre-underlayer to said auxiliary recording layer, including said pre-underlayer and said auxiliary recording layer, is given as a crystalline total thickness (nm), said interface roughness (nm)<0.4(nm), and said interface roughness (nm)×said crystalline total thickness (nm)<21(nm) are satisfied, wherein said crystalline total thickness is 60 nm or less and wherein oxygen contained in the separation layer is segregated on oxides of the magnetic recording layer and Ru is segregated on magnetic grain, wherein said separation layer comprises $WO_3$.

3. The perpendicular magnetic recording medium according to claim 1, wherein said pre-underlayer is a layer in which a layer made of crystalline NiW is formed on a layer made of amorphous NiTa or amorphous CrTa.

4. The perpendicular magnetic recording medium according to claim 2, wherein said pre-underlayer is a layer in which a layer made of crystalline NiW is formed on a layer made of amorphous NiTa or amorphous CrTa.

* * * * *